Nov. 17, 1925.

C. E. WERTMAN

CHAIN AND PARTS THEREFOR

Filed Nov. 1, 1923

1,561,676

2 Sheets-Sheet 1

INVENTOR.
Charles E. Wertman
BY Gifford, Bull & Bull
his ATTORNEYS.

Nov. 17, 1925. 1,561,676
C. E. WERTMAN
CHAIN AND PARTS THEREFOR
Filed Nov. 1, 1923   2 Sheets-Sheet 2

INVENTOR.
Charles E. Wertman
BY Gifford, Bull & Bull
his ATTORNEYS.

Patented Nov. 17, 1925.

1,561,676

UNITED STATES PATENT OFFICE.

CHARLES E. WERTMAN, OF HARTFORD, CONNECTICUT, ASSIGNOR TO THE WHITNEY MFG. CO., OF HARTFORD, CONNECTICUT, A CORPORATION OF CONNECTICUT.

CHAIN AND PARTS THEREFOR.

Application filed November 1, 1923. Serial No. 672,050.

*To all whom it may concern:*

Be it known that I, CHARLES E. WERTMAN, a citizen of the United States, and resident of Hartford, in the county of Hartford and State of Connecticut, have invented certain new and useful Improvements in Chains and Parts Therefor, of which the following is a specification.

My invention relates to link chains of the silent type and consists of certain novel parts and combinations of parts which render the chain efficient, durable and noiseless in operation, which novel parts and combinations will be specifically described herein and pointed out in the appended claims.

Figure 1:
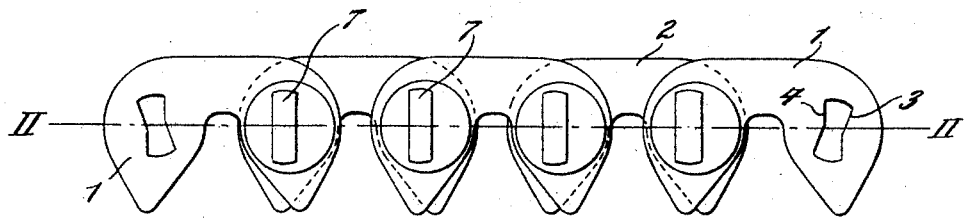
Figure 2:
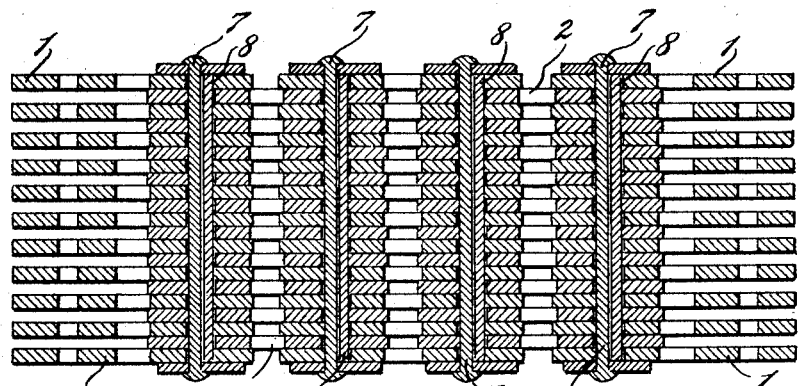
Figure 3:
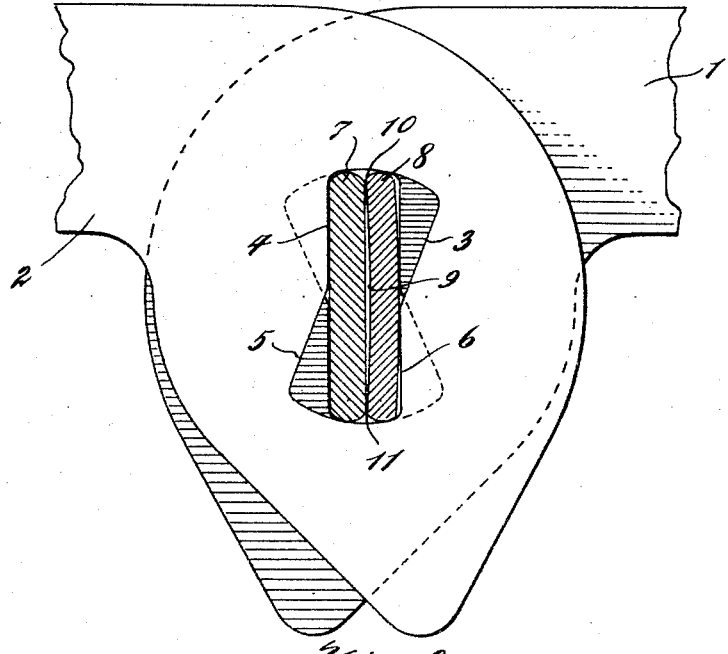
Figure 4:
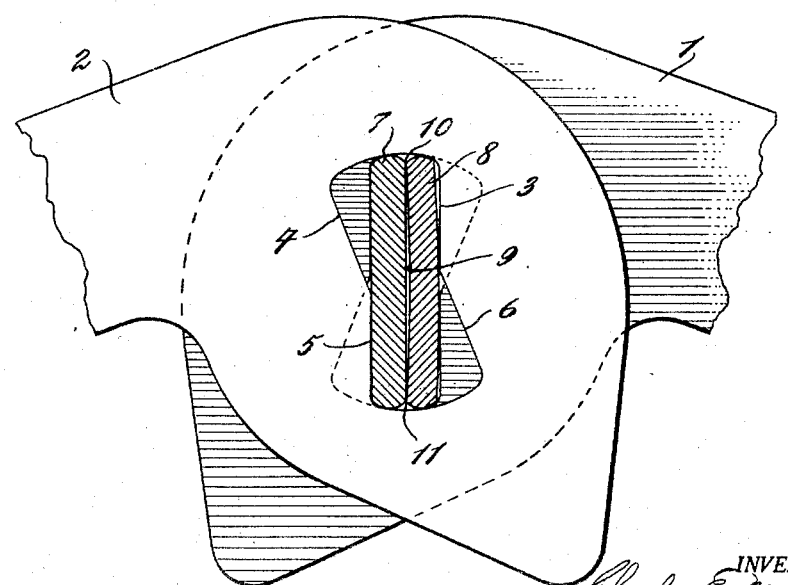

My invention will be better understood by reading the following description taken in connection with the drawings showing one embodiment thereof and in which Fig. 1 is a side view of a portion of a chain containing one embodiment of my invention; Fig. 2 is an inverted sectional view taken on the plane of the line II—II of Fig. 1; Fig. 3 is a sectional elevation showing the joint between adjacent pitches on a straight run of the chain and Fig. 4 is a view similar to Fig. 3 with the joint flexed.

Referring to the drawings, the chain consists of a series of links 1 and a series of similar links 2 with their ends overlapping the ends of the links 1. The links 1 and 2 have openings through their ends which register in the overlapped ends of the links. The openings in the individual links may be of any desired form so far as my invention is concerned. However, I prefer to use a link having openings in its ends which flare outwardly from the pivotal center of the link joint, such as that illustrated in the drawings. In the form of chain shown, the links have openings with straight sides 3, 4, 5 and 6 and a composite pin therein having two members 7 and 8. The flat side of the openings in the links 1 contact with the lower part of the member 7 and the sides 6 of the openings in the links 2 contact with the lower portion of the member 8 during the straight run of the chain. Fig. 4 shows the position of these parts when the joint is flexed. It will be noted that the member 8 is curved from edge to edge and is so arranged relative to the member 7 that a space 9 exists between the adjacent sides of the members 7 and 8. The members 7 and 8 are in contact with each other at the points 10 and 11 so that when tension is placed upon the chain the tendency is to close up the space 9 by compressing the composite pin in the line of pull of the chain. The members 7 and 8 preferably have parallel sides so that they may be easily and inexpensively manufactured from stock material, but I do not limit my invention to this particular form of pin member as other forms may be used, if desired.

I have discovered that by providing a certain amount of resiliency in the joint of chains of the type illustrated, substantially all of the noise is eliminated from the chain. One of the simplest ways of providing the resiliency to the joint is that of bending one or both of the members 7 and 8 to produce a slight space 9 between them so that when the chain is placed under tension there will be a tendency to compress the pin. It will be apparent that the space 9 may be produced between the pin members in other ways than by bending the member 7 or 8 and I desire it to be understood that my invention is not limited to the exact arrangement shown. For instance, the sides of the member 8 might be made straight and a slight projection placed at the top or bottom inside edge or on both inside edges so as to separate the middle portion of the member 8 from the member 7 or vice versa; but the arrangement shown is preferred because of the simplicity and cheapness of manufacture. As above stated the openings through the links may also be modified in form without, in any manner, departing from the spirit of my invention. By the arrangement shown many advantages are secured, the chief of which is the absence of noise during the operation of the chain; chains embodying this idea are also of long life in that the wear is reduced because of the resilient nature of the joints. Other advantages will be apparent to those skilled in the art.

I claim:

1. In a chain of the silent link type, a plurality of overlapping links having registering openings in the overlapping ends and a split pin in said openings with a space between the adjacent sides of the pin members, one of the sides of said pin being flexible whereby the pin lends resiliency to the joint.

2. In a chain of the silent link type, a plurality of overlapping links having registering openings in the overlapping ends, and two pin members in said openings, one of said members being bent edgewise and away from the other at its center.

3. In a chain of the silent link type, a plurality of overlapping links having registering openings in the overlapping ends and two pin members in said openings, said members being arranged to contact along their edges and being separated along their central portions.

4. In a chain of the silent link type, a plurality of overlapping links having registering openings in the overlapping ends and two pin members in said openings, said members being separated along their central portions.

5. In a chain of the silent link type, a plurality of overlapping links having registering openings in the overlapping ends and two pin members in said openings, one of said members being straight and the other being curved from edge to edge with the concave side next the other member.

6. In a chain of the silent link type, a plurality of overlapping links having registering openings in the overlapping ends and two pin members in said openings, one of said members being flexible laterally and curved with its concave side next the other member.

7. In a chain of the silent link type, a plurality of overlapping links having registering openings in the overlapping ends, two pin members in said openings, one of said members being flexible and curved with its concave side next the other member, and its convex side engaging the links of one pitch of the chain.

8. In a chain of the silent link type, a plurality of overlapping links having registering openings in the overlapping ends and two pin members each having parallel sides in said openings, said members being sprung apart at their central portions to lend resiliency to the joint.

9. In a chain of the silent link type, a plurality of overlapping links having registering openings in the overlapping ends and a substantially rectangular pin member having a longitudinal opening therethrough, the links of adjacent pitches engaging the sides of said pin member and acting to spring a part of the pin to lessen said opening and lend resiliency to the joint.

10. In a chain of the silent link type having rocker joints between adjacent pitches, a pin adapted to be compressed by the links of adjacent pitches when the chain is under tension.

CHARLES E. WERTMAN.